No. 771,266. PATENTED OCT. 4, 1904.
W. H. PRATT.
ELECTRIC METER.
APPLICATION FILED FEB. 16, 1903.
NO MODEL. 2 SHEETS—SHEET 1.

Witnesses
George H. Tilden.
Helen Orford

Inventor
William H. Pratt
By Albert G. Davis
Att'y

No. 771,266. PATENTED OCT. 4, 1904.
W. H. PRATT.
ELECTRIC METER.
APPLICATION FILED FEB. 16, 1903.
NO MODEL. 2 SHEETS—SHEET 2.

Witnesses:
George H. Tilden.
Helen Orford

Inventor
William H. Pratt,
By Albert G. Davis
Att'y.

No. 771,266.

Patented October 4, 1904.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

SPECIFICATION forming part of Letters Patent No. 771,266, dated October 4, 1904.

Application filed February 16, 1903. Serial No. 143,479. (No model.)

*To all whom it may concern:*

Be it known that I, WILLIAM H. PRATT, a citizen of the United States, residing at Lynn, county of Essex, State of Massachusetts, have invented certain new and useful Improvements in Electric Meters, of which the following is a specification.

My present invention relates to an electric meter of that type in which the weight of the moving member is to a greater or less extent supported by some heavy fluid, such as mercury, in which the member is immersed. Where it is desirable that the movable member should be more or less completely submerged, it has been necessary to weight the shaft projecting from the movable member in order to produce the desired degree of immersion, the extra weight thus provided being rendered necessary by the relatively greater specific gravity of the mercury. In order to do away with the disadvantages attendant upon the use of weights carried by the movable member for the purpose of submerging, I provide a magnetic device which is arranged to oppose the upward thrust of the moving element submerged in the mercury, thereby permitting the use of a light moving member and one in which the center of gravity is low as compared with the position of the center of gravity when submerging-weights are used. The center of gravity being low, the moving element has less tendency to wabble in the supporting fluid.

In addition to the above my invention embodies other features of novelty, all of which are described at greater length in the following specification, which is to be taken in connection with the accompanying drawings.

Figure 1:
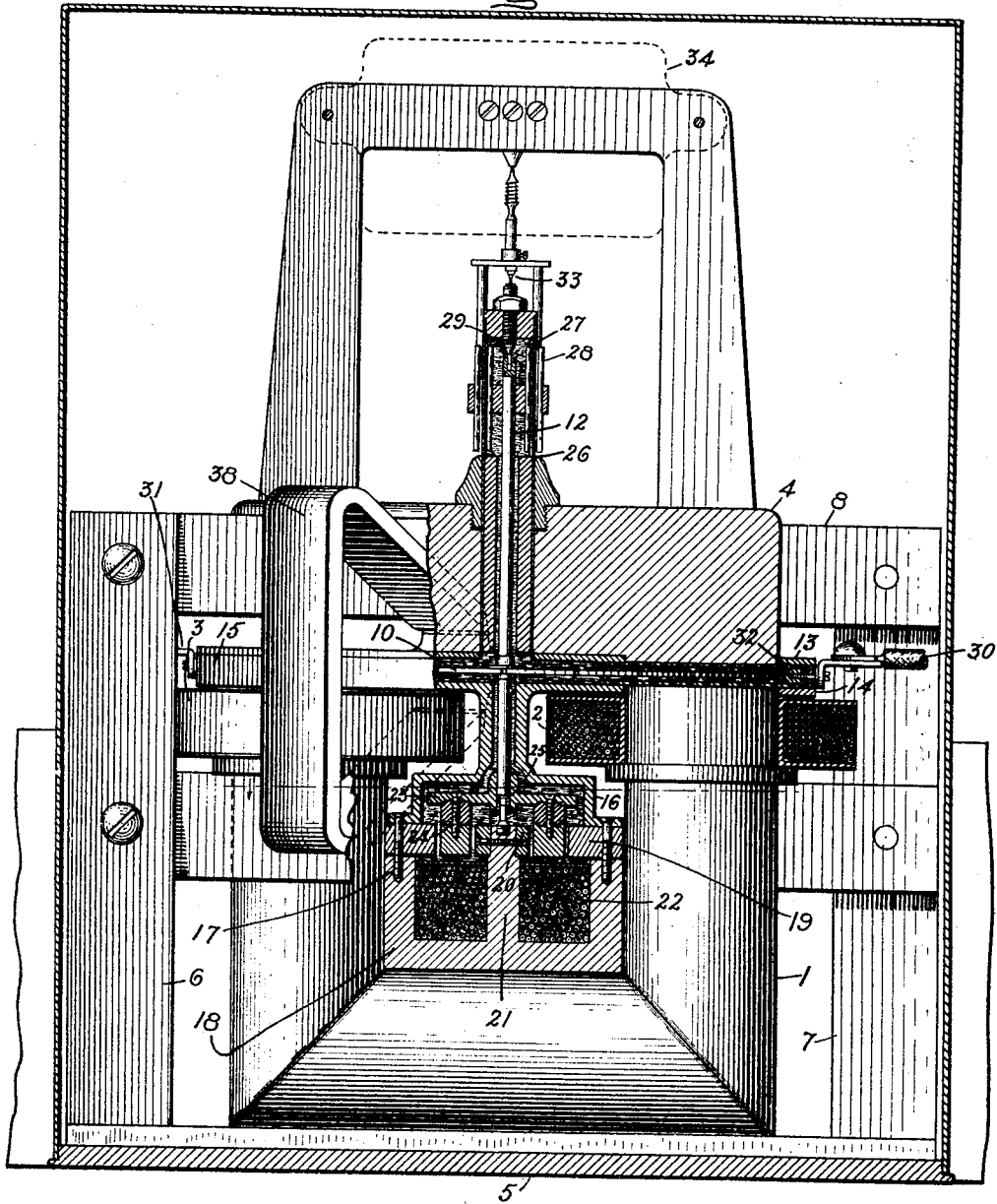
Figure 2:
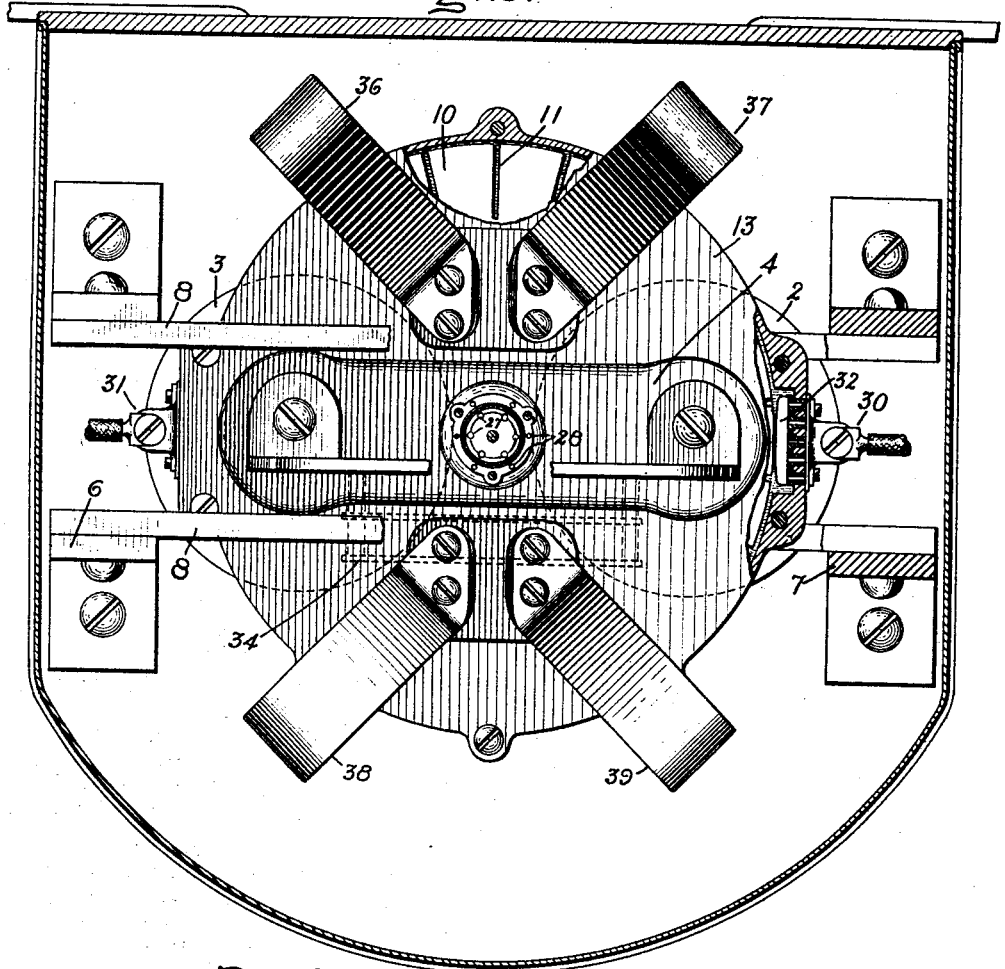
Figure 3:
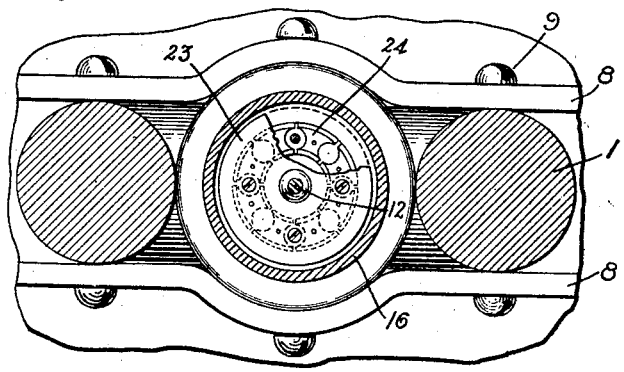

In the drawings, Figure 1 represents a side elevation, partly in section, of one embodiment of a meter constructed in accordance with my invention. Fig. 2 is a plan view of the same, and Fig. 3 is a detail.

The meter shown in the drawings is one in which the main current or a proportional part thereof is caused to traverse a rotatable disk movable through a magnetic field produced either by a permanent magnet or by an electromagnet in shunt to the mains. In the present instance the magnet employed is an electromagnet having a U-shaped core 1 provided with exciting-coils, one of which is shown in section at 2 and the other as it appears externally at 3. The return-circuit for the magnet is provided by a block of iron or other magnetic material 4, separated from the poles of the magnet 1 by a narrow space. The core 1 and the block or keeper 4 are supported from the base 5 of the meter by means of standards 6 7, carrying the cross-bars 8, to which the parts are secured by screws or otherwise, as indicated, for example, at 9 in Fig. 3.

The movable element of the meter consists of a disk 10, radially slitted, as indicated, for example, at 11 in Fig. 2, this disk being carried by a vertical shaft 12. The disk is mounted so as to rotate in the spaces between the pole-pieces of the core or magnet 1 and the keeper 4. The disk is inclosed within a fluid-containing casing having circular upper and lower walls 13 and 14, the lower wall 14 having an upwardly-projecting flange 15, which forms the inclosing edge of the casing.

The lower wall 14 of the casing is provided with a hollow downwardly-extending member 16, the lower edge of which is flanged and secured by screws 17 or otherwise to the upper edge of an iron-clad magnet 18, the magnetic field of which extends from an annular pole-piece 19 across a ring-shaped space to a cylindrical pole-piece 20, formed on the upper end of a central standard or core 21. The exciting-coil for this iron-clad magnet is circular and surrounds the central core 21, as clearly indicated at 22. The lower end of the shaft 12 carries a disk 23, from which depends a circular row of blocks 24, of magnetic material, adapted to move in the annular magnetic field formed between the inner and outer pole-pieces of the iron-clad magnet 18. These blocks of magnetic material 24 are cut away between their outer and inner edges, and these edges in turn are separated from each other by a narrow space, as will be readily seen by reference to Fig. 3.

The movable member is held in a central position at its lower end by means of the centralizing pivot or stud 25, mounted in the upper end of the central core 21 and engaging loosely a central opening in a bushing carried by the lower end of the shaft 12, as indicated. The upper end of the shaft 12 is inclosed within a tube 26, and this tube, together with the fluid-inclosing chamber for the disk 10, as well as the chamber formed by the hollow extension 16, is completely filled with a heavy fluid—such, for example, as mercury. The iron-clad magnet 18 acting upon its circular armature opposes the upward thrust of the movable member of the meter, thereby permitting the same to be completely immersed.

A plurality of vertically-arranged magnets 27 are supported symmetrically from the shaft 12 and are adapted to rotate concentrically with respect to a similarly-arranged and rotatably-mounted group of armatures 28 outside of the tube 26. The magnets within the tube 26 when rotated therefore drag around the armatures 28.

To prevent displacement of the upper end of the meter-shaft, a pivot 29 may be provided engaging with the walls of an opening drilled centrally in the upper end of the shaft 12. If desired, this opening may be provided with a suitable bushing, as in the lower bearing.

Current flows across the disk 10 diametrically, and means for its entrance and exhaust are provided by the terminals 30 and 31, which communicate electrically with current-transmitting terminals or members, such as 32, mounted within the casing for the disk 10 and in proximity to the edge of the disk. Current flows from these current-transmitting members into the disk and passes through the disk in a general diametrical direction, its passage circumferentially being obstructed by means of the radial slits 11 formed therein. The current thus flowing through the disk 10 across the magnetic fields produced by the magnet 1 causes the disk to be set in motion through the field, as will be readily understood. This motion is transmitted from the inner set of magnets 27 to the outer set of armatures 28. This outer set of armatures forms part of a rotatable member which is pivotally supported at 33 and drives a counter or register of any well-known construction, the position of which is indicated in dotted lines at 34 in Fig. 1 and also in Fig. 2. The motion of the disk 10 is retarded not only by the friction of the mercury, but also by the damping-magnets 36 to 39, inclusive, arranged in pairs, so as to embrace the disk in a well-known manner, as indicated.

What I claim as new, and desire to secure by Letters Patent of the United States, is—

1. In an electric meter, the combination of a rotary member, a body of fluid of high specific gravity in which the member is immersed, and a magnetic device for resisting the upward thrust upon said member due to its immersion in said fluid.

2. In an electric meter, the combination of a rotary member, a body of fluid in which said member is adapted to be immersed, and magnetic means for submerging said member in said fluid.

3. In an electric meter, the combination of a rotary member immersed in mercury, and magnetic means for resisting the upward thrust on the member due to its immersion in said mercury.

In witness whereof I have hereunto set my hand this 13th day of February, 1903.

WILLIAM H. PRATT.

Witnesses:
DUGALD McK. McKILLOP,
J. A. McMANUS.